July 26, 1960
L. E. SODERQUIST
2,946,088
ACCESSORY FOR TIRE SHAPING AND CURING PRESSES
Filed Aug. 21, 1957
3 Sheets-Sheet 1
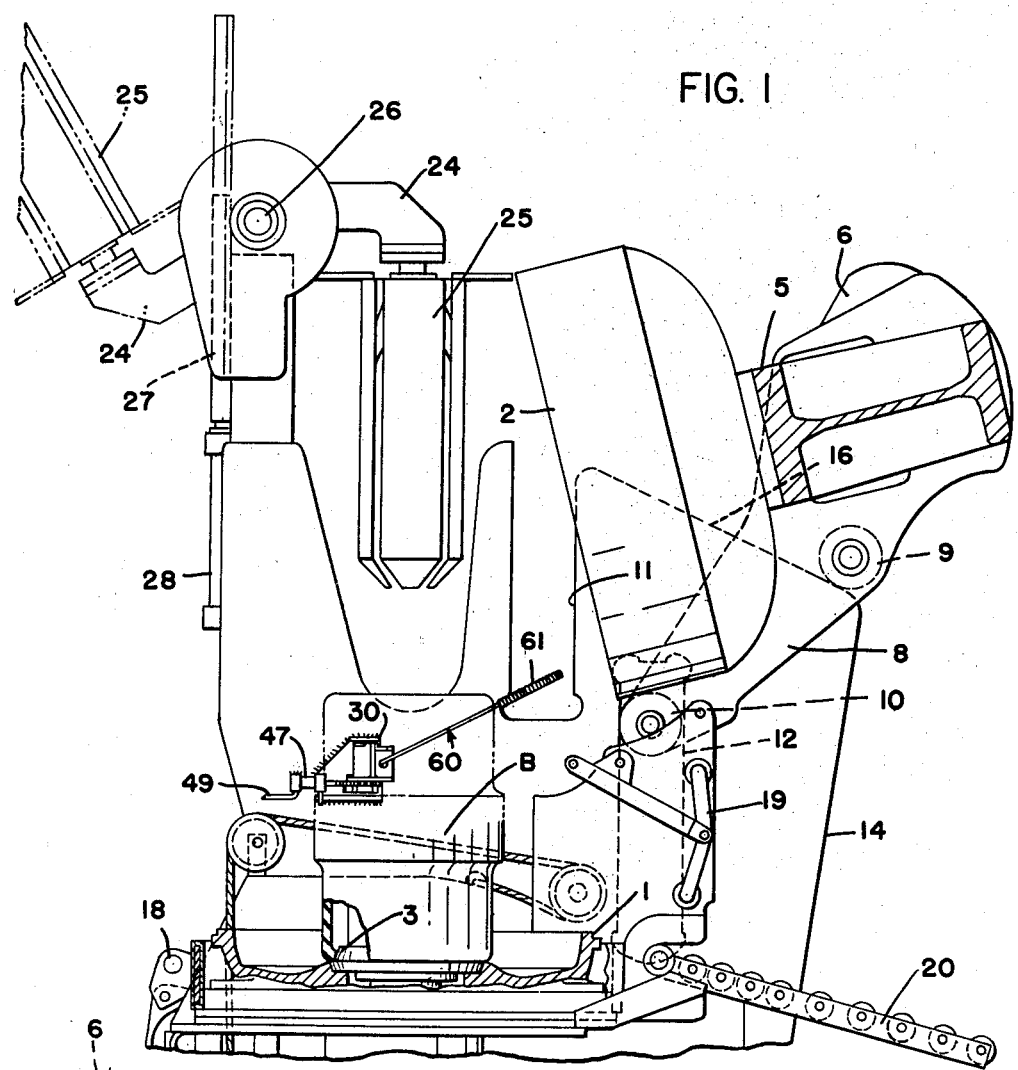
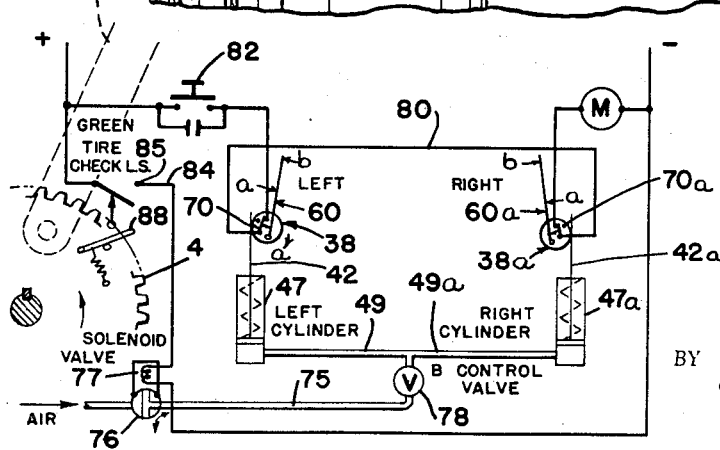
INVENTOR.
LESLIE E.
SODERQUIST
BY
ATTORNEYS

INVENTOR.
LESLIE E. SODERQUIST
BY
ATTORNEYS

July 26, 1960  L. E. SODERQUIST  2,946,088
ACCESSORY FOR TIRE SHAPING AND CURING PRESSES
Filed Aug. 21, 1957  3 Sheets-Sheet 3

INVENTOR.
LESLIE E. SODERQUIST
BY
ATTORNEYS though the invention is shown in its best known and pre-

United States Patent Office
2,946,088
Patented July 26, 1960

2,946,088

ACCESSORY FOR TIRE SHAPING AND CURING PRESSES

Leslie E. Soderquist, Silver Lake, Ohio, assignor to The McNeil Machine & Engineering Company, Akron, Ohio, a corporation of Ohio Filed Aug. 21, 1957, Ser. No. 679,433

4 Claims. (Cl. 18—2)

The present invention has reference to presses of the type devised by the present applicant for shaping and curing pneumatic tires. Presses of the type described, which are covered in patents and applications of the present applicant, are especially adaptable for the incorporation therewith of automatic loading and unloading equipment such as covered in prior application Serial No. 567,555, filed February 24, 1956, and the invention is shown and described as used with the mechanism of the said application. However, it will be understood that the invention is not limited to its use with the mechanism of the said application, but may be used with other presses in which unshaped and uncured tire bands are formed into tire shape and then vulcanized. It may also be used with presses in which different mechanism may be employed to position the uncured band in the press.

It is also to be noted that the invention is not limited for use with a diaphragm type of shaping and curing press, but may be used with a press for curing tires without employing a diaphragm.

The invention is shown as applied to a dual type press, i.e., one in which two tires are shaped and cured at a single operation, but it may be employed in a single type of curing press. It is shown with a press in which the upper mold section is swung backwardly at the upper end of its opening movement and forwardly at the upper end of its closing movement, but the invention may be used in presses in which the movable mold section moves in a straight line at all times.

Where the uncured band is placed in the press by the operator, it is his duty to see that the band is properly located or in registry with a mold section, but, with automatic operations, supervision by the operator is not feasible. In presses in which the uncured tire band is automatically loaded, the uncured tire band will not, in some instances, seat properly in the lower mold section. This will locate the upper edge of the tire band out of position to be properly shaped when the press closes, so that the tire band is ruined when the press closes upon it.

It is the object of the present invention to devise a mechanism which may be incorporated in presses of the types set forth and which will detect a misplaced band before the upper mold section closes upon it, and stop the oncoming mold section before it reaches the band. The supervisor's attention is thus called to the press in which this situation has developed and he will then properly locate the band and restart the press.

In speaking of the mold sections, the terms "upper" and "lower" are relative only. It will be understood that while the invention is shown in its best known and preferred form and in sufficient detail to enable the principles and mechanism thereof to be understood, the invention is not to be considered as restricted to such details. The invention may be incorporated in other forms and details may be altered or improved upon without departing therefrom.

In the drawings in which the invention is shown as at present perfected:

Fig. 1 is a side view of a typical press with an uncured band B properly seated therein. In this view the press is fully opened and the band has just been delivered by a collapsible chuck of the type shown in prior application Serial No. 567,555. The chuck will return to the dotted line position before the press closes. The press is shown as equipped with automatic unloaders such as shown in applicant's U.S. Patent No. 2,832,992, issued May 6, 1958.

Fig. 7 is a wiring diagram for a dual press, it being understood that for a single type press the wiring will be on the same general principles.

The press mechanism

So much of the press will be described as is necessary for an understanding of the invention.

Figure 2:
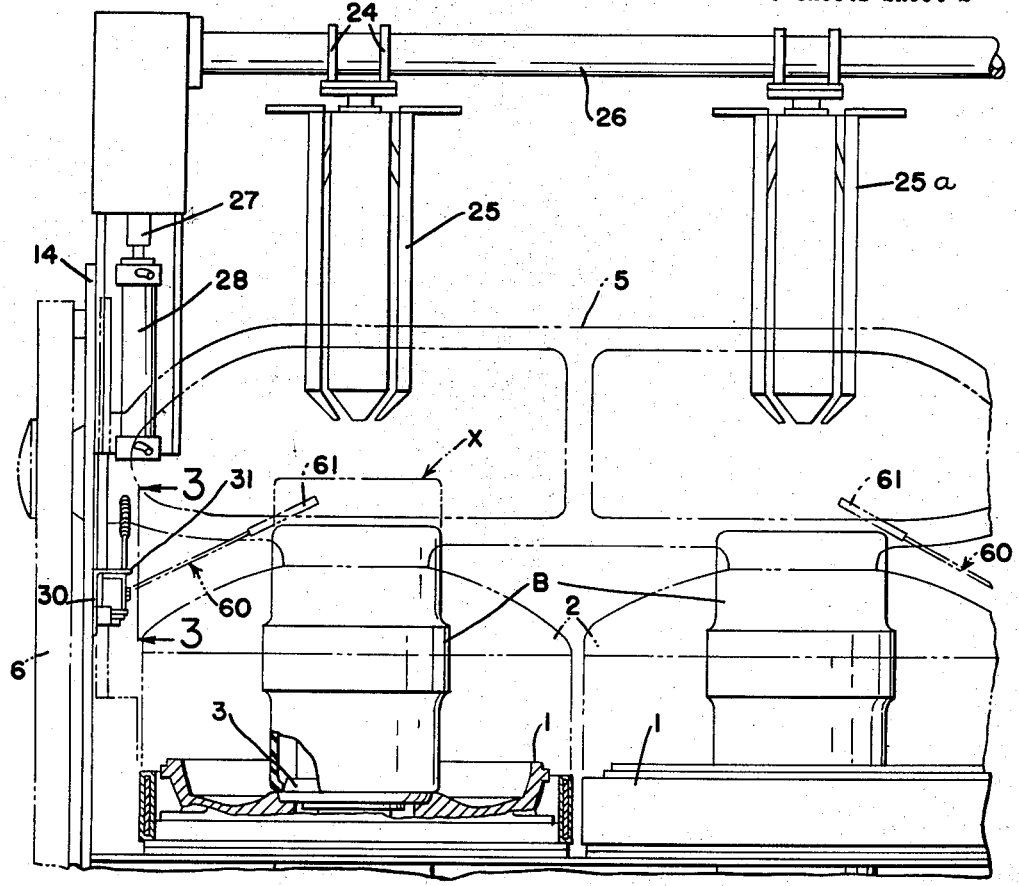
Fig. 2 is a front view of the press showing the dual mold arrangement.

The lower mold section is given the reference numeral 1 and the upper mold section is indicated at 2. In each section there is a bead ring 3 which, with the inner surface of the mold section, forms the bead seat which shapes the bead when the tire is being vulcanized. In Figures 1 and 2 the band is shown in full lines as it should be properly seated in the lower mold and in this situation both edges of the band will register with the bead seats in the respective sections when the press closes upon the band, in the well-known tire forming operation.

As with all presses of this type, the upper mold moves toward the lower mold in a straight line, with both mold faces in parallelism during the shaping operation. In presses of the type shown, the upper mold section swings out of the way at the upper end of its opening movement to allow clearance above the lower mold section so that the automatic loading mechanism may be located above the press.

To accomplish the vertical and swinging movements of the upper mold section, the press is shown here as of the type covered in applicant's Patent No. 2,808,618, issued October 8, 1957. It is sufficient to say that the upper mold section is carried on a crosshead 5 which, in the dual press, extends across both mold units. Toggle links 6 moved by an operating gear, indicated at 4 in Fig. 7, raise and lower the crosshead. The crosshead is provided with two guide arms 8 having guide rollers 9 and 10 which, during the parallel movement of the mold sections, move in vertical slots 11 and 12, respectively, located in guide plates 14 at opposite sides of the press. At the upper end of the slots 11, the guide plates are formed with backwardly and downwardly inclined runways 16, over which the rollers 9 move during the first part of the closing movement and the latter part of the opening movement to give the tilting movement to the upper mold sections. For a more complete explanation of this operation, reference is made to the said Patent No. 2,808,618.

Front and rear stripping arms 18 and 19 and an inclined gravity conveyor 20 are shown which remove the tire at the end of the curing operation, as described in applicant's Patent No. 2,832,992, to which reference may be had. This mechanism is actuated after the press is opened but before the loading device comes into play. The mechanism for depositing an uncured band on the lower mold section (or sections) consists of an expansible holder or chuck 25 which is carried upon arms 24 from a rock shaft 26 located at the upper front side of the press and by which the band holder moves fom the position shown in dotted lines to the position shown in full lines in Fig. 1. The shaft 26 is rocked in timed relation to the opening and closing of the press so that when the press is open and after the cured tire has been removed, a green or uncured band is deposited on the lower mold section. Thereupon, the loading device is swung out of the way of the upper mold section to the dotted line position of Fig. 1 where it receives the next uncured tire band. The movement of the loader is through a rack and gear instrumentality shown at 27 which is propelled by a double acting cylinder 28.

Each loader 25 and 25a in the form shown in a segmental chuck which is provided with expanding and contracting devices operated in proper timed relation so that when the chuck is in position to receive a new tire band it will be collapsed, but as soon as a tire band is placed over the chuck the chuck expands, gripping the band from the interior. The expansion of the chuck holds the band in true circular condition so that it will normally seat correctly on the lower mold. At the proper time in the operation of the press, the chuck is moved over the lower mold and then collapsed so that the band drops onto the lower mold.

For a full detailed description of the green band loader, reference is made to prior application Serial No. 567,555, heretofore referred to.

In most cases, the band will seat properly and the operation of the press will proceed without interruption, but due to the fact that the band is dropped onto its seat it may sometimes bounce and get out of position or it may hang on the diaphragm or bead forming mechanism in a tubeless tire curing operation. A typical misplacement of the band is shown by the dotted line x in Fig. 2.

*Band detector*

Briefly stated, the mechanism for detecting a misplaced band is a device which may be termed a feeler or detector which has a range of movement so as to sweep angularly across the band just after it has come to rest on the lower mold section, but before the press closes about the band. If the band is properly located, the device will angularly pass through or across the space lying immediately adjacent or just above the band without incident, but if the band is out of place the feeler will strike it and through suitable electrical switch means the press operating mechanism will be stopped and will not start until the operator has adjusted the band and restarted the press operating mechanism.

In a dual press such as shown herein, the press is equipped with two detectors or feelers, either one of which will stop the press if its tire band is out of place. As these are duplicates, except for right and left, one only will be described at this point.

Attached to each side of the press is a bracket 30 which is provided with an overhanging flange 31, and attached to the bracket by bolts 32 is a base plate 34. In the flange 31 is a bolt 35 held in position by nut 36. The lower end of the bolt is reduced to form a pivot for a holder in the form of a swinging housing which is given the general reference numeral 38. The lower side of the housing is pivoted on the upper end of a hollow shaft 39 which is fixed in the plate 34.

The lower side of the housing 38 is formed as a segmental gear 40 by which the housing is moved during the operation of the press. The sweeping movement of the housing, which passes the feeler back and forth over the band, is obtained through a rack 42 which meshes with segmental gear 40 and which moves over the plate 34. The inner end of the rack is provided with a socket 44 in which is fastened a rod 45 which is carried at its other end by a piston 46 operating in a cylinder 47 which is fastened to the frame of the press by bolts 48. Pressure to project the rod 46 is admitted to the cylinder through a line 49 and a spring 50 returns the piston when the pressure is relieved. By the admission of pressure to the cylinder and its release, the feeler is moved over the band and this operation is controlled by valve mechanism to be described.

To the front of the housing 38 is attached, by bolts 53, a cover plate 54 having upper and lower spaced flanges 55. Across an outer corner of the flanges is a vertical pivot pin 56 upon which rotates an angular plate 58 to which is attached by a bolt 59 the detector arm or feeler 60. As shown in the several views the feeler extends upwardly at approximately the angle shown for a band of the size illustrated, the position of the arm being adjustable for varying sizes of bands. At the end of the arm is located a tightly coiled spring extension 61 which may be bent to secure a finer adjustment and which will stay in its adjusted position. As shown in Fig. 2, the outer end of the feeler will just clear the upper edge of a properly seated band.

Seated in the cover plate 54 is a pin 64 which projects outwardly through an aperture 65 in the angular plate 58. A light coil spring 66 surrounding the pin bears against the rear side of the plate 58 so that the plate is normally held against the surface 67 of the plate 54 in the position shown in Fig. 4 with the detector arm standing out straight from the housing 38. This is the position in which the arm remains while the housing is stationary and if the detector arm does not encounter the band during the swinging operation.

Figure 5:
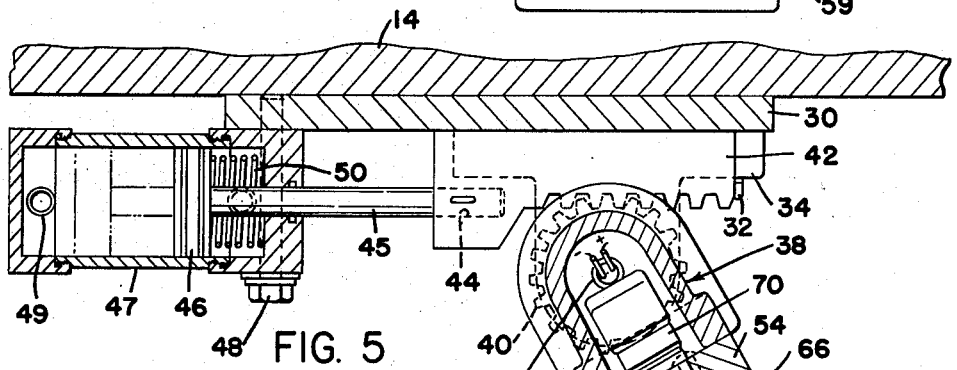
Fig. 5 is a section on the line 5—5 of Fig. 3.
Figure 6:
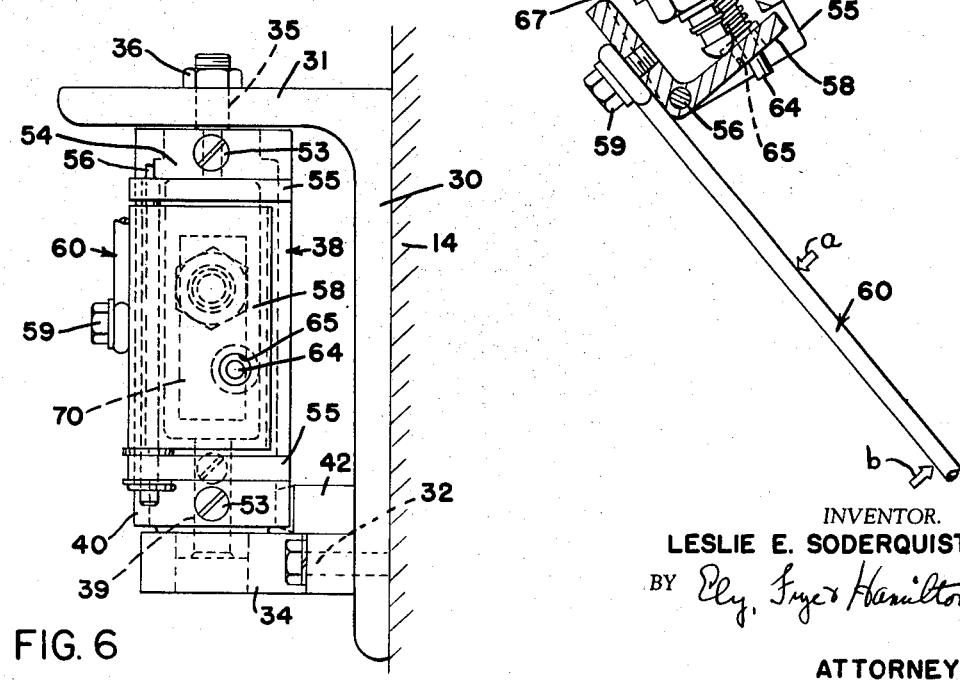
Fig. 6 is an end view, the location of which is shown by the section line 6—6 of Fig. 3.

If, however, while the detector assembly constituted by the housing 38 and plates 54 and 58 is moving outwardly in the direction of the arrow a in Fig. 5, the green tire band is out of position so that it is struck by the feeler 60—61, the feeler will be moved in the direction of the arrow b in Fig. 5 and this will cause the plate 58 carrying the feeler to rock into the position shown in Fig. 5.

Figure 3:
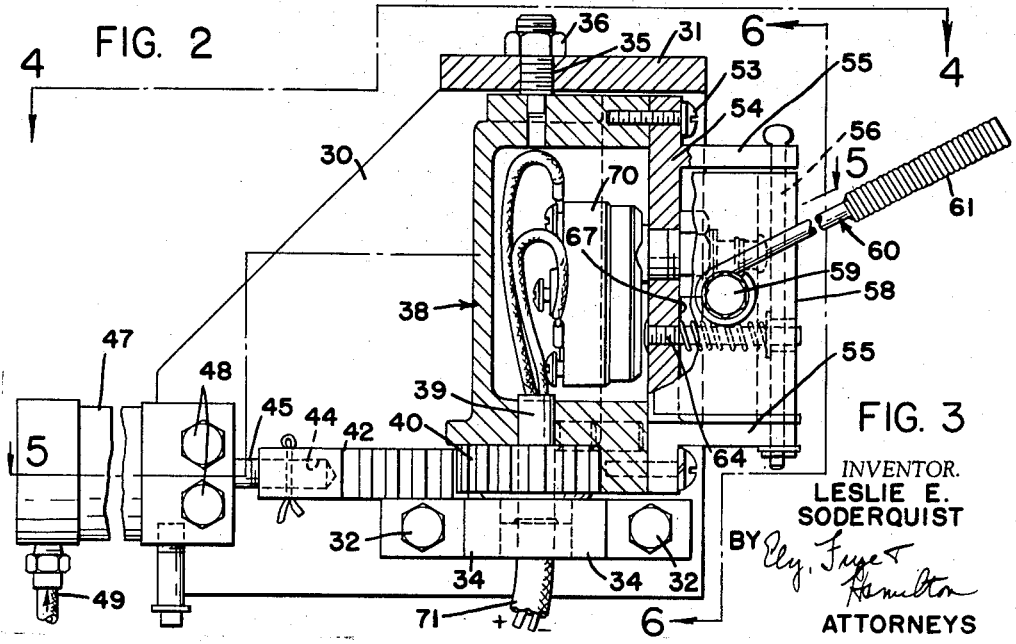
Fig. 3 is an enlarged view of the mechanism which operates the detector arm which stops the press if its tire band is not properly seated.
Figure 4:
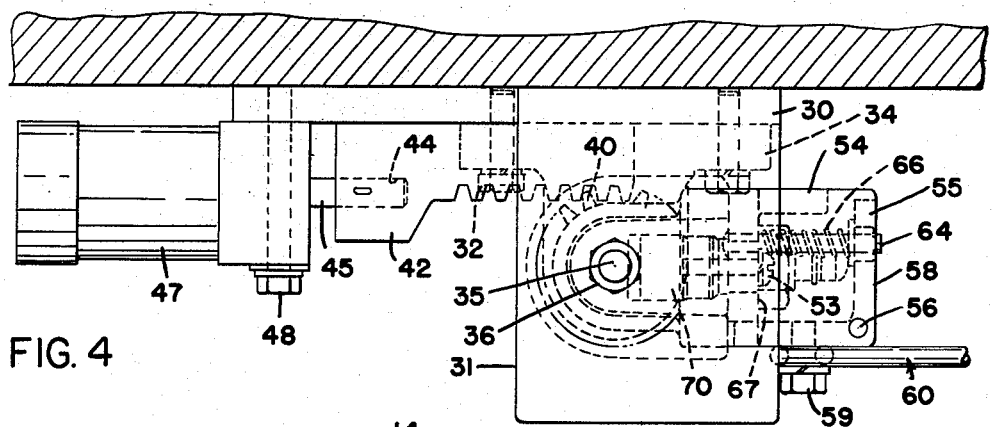
Fig. 4 is a view looking down on the detector operating mechanism, this view being located on the line 4—4 of Fig. 3.

Located in the housing 38 is a normally closed micro switch which is given the reference numeral 70, the operating button of the switch being located immediately behind the front face of the plate 58 and just out of contact therewith when the plate 58 is in its normal position as shown in Fig. 4. However, when the plate 58 is rocked backwardly, as in Fig. 5, the button is depressed and the switch opened, which, through suitable connections, stops the closing movement of the press. The wires leading to the switch pass out of the detector assembly through the hollow pivot pin 39 and flexible cable 71, as shown in Fig. 3.

*The wiring diagram*

In order to complete the disclosure, there is shown an exemplary wiring system for operating the feeler arms. The wiring for operating the press and the loading and unloading mechanism is not essential to an understanding of the invention involved here. In Fig. 7 is shown the wiring for a dual press and such reference numerals as are applicable have been applied to Fig. 7, the numeral for the left hand unit being the same as in the other views, but the numerals for the right hand unit being given the exponent a.

Air under pressure to operate the cylinders 47 and 47a is admitted through the line 75 in which is located the three-way valve 76 which is normally closed to the line 75, but is rotated to admit air to the cylinders and project the feeler arms 60 and 60a by a solenoid 77. Air in the line passes to the lines 49 and 49a through a control valve 78 which regulates the speed of the feeler arms 60 and 60a. When the solenoid 77 is deenergized, the valve 76 is turned to release the pressure from the cylinders 47 and 47a, and the springs 50 and 50a return the feeler arms.

The normally closed switches 70 and 70a are located in series in the line 80 to the press motor relay starter M. When the press is to be started the operator presses the starting button 82 which starts the press in operation, the relay through a normal holding contact keeping the circuit closed during normal operations until the press cycle is completed. It will be seen that if either switch 70 or 70a is opened the connection to the relay will be broken and the press will stop.

Provision is made to pass the feelers 60 and 60a across their respective tire bands just after the press starts to close, this movement being completed so that, if the band is correctly positioned, both feelers make their outbound trips and return to idle positions before the upper mold sections reach the top of the tire bands. To perform this operation, the solenoid 77 is located in a line 84 which is connected to the line 80 and in which is placed the normally open switch 85. This switch is arranged to be closed when the press starts to close and for this purpose a variety of devices may be employed. As exemplary, there is shown an arrangement by which the operating arm for the switch 85 is located in the path of a striker arm 88, which is carried by one of the large gears 4 which operate the toggle. The gear 4 rotates in the direction of the arrow in Fig. 7 to close the press and the striker 88 is so positioned that it closes the switch for a brief period just as the gear 4 starts its rotation to close the press, which, through the solenoid 77, opens the valve 76 to the line 75. When the striker arm releases the switch 85 the feeler arm will have completed its outbound movement and the valve 76 will be opened to the exhaust by the opening of the switch 85 and the springs 50 and 50a will return the feelers to their idle position.

The striker arm 88 is pivotally mounted, as shown in Fig. 7, so that it bypasses the switch 85 on the opening movement of the press.

The stoppage of the press will open the circuit 80 and when the position of the band which is out of place is rectified, the operator presses the starter button 82 and the press resumes its closing movement.

Resumé

The operation of the mechanism for detecting misplaced bands and the manner in which this device is coordinated and combined with the automatic loading and unloading mechanism for a tire shaping and vulcanizing press will have been made clear from the foregoing. As soon as an uncured band is deposited on the lower mold section, the press starts to close and will perform in the usual manner unless one or both bands is out of position. The word "detector" is used in the specification and claims to denote any type of device which will be intercepted by a misplaced uncured band and is not limited to a mechanical arm, for in the aspects of the invention as set forth in the broader claims any form of device, whether mechanical or electrical, which will be actuated by an out-of-position band can be used.

So far as known, this is the first organized mechanism for detecting bands which are not properly seated and for arresting the closing movement of the press in such a case. As such, the invention is entitled to protection commensurate with its pioneer character and is not to be limited to following the details shown and disclosed herein.

What is claimed is:

1. In a tire press for shaping and curing unvulcanized tire bands within separable upper and lower mold sections, said press being adapted when open to receive an uncured band in registry with a lower mold section and having means for closing said mold sections around a band, a detector mechanism mounted at the side of said mold sections, an arm pivotally mounted on said detector mechanism, said arm being arcuately movable angularly through a portion of the space lying immediately above the upper edge of a band whose lower edge is registered with a mold section and in close proximity past that portion of the upper edge of said band nearest said detector mechanism, and means connecting said detector mechanism to said press actuated by said arm to interrupt closing of the mold sections upon misalignment of the band.

2. In a tire press for shaping and curing unvulcanized tire bands within separable mold sections, said press being adapted when open to receive an uncured band is registry with said mold sections and having means for closing the mold section and arculately movable past and in close mounted at the side of said mold sections, said detector mechanism comprising a feeler angularly mounted with respect to a band whose lower edge is registered with a mold section and arcuately movable past and in close proximity to the upper edge of such a registered band, and means inter-connecting said detector to said press to stop the press when the feeler contacts the band.

3. In a tire press for shaping and curing unvulcanized tire bands within separable mold sections, said press being adapted when open to receive an uncured band in registry with said mold sections and having means for closing the mold sections around a band, a detector mechanism mounted at the side of said mold sections, said detector mechanism comprising a feeler angularly mounted with respect to a band whose lower edge is registered with a mold section and arcuately movable past and in close proximity to the upper edge of such a registered band, and electrical means connecting said detector means to said press to interrupt the closing movement of said press upon misalignment of said band.

4. In a power operated tire press for shaping and curing unvulcanized tire bands within separable upper and lower mold sections, said press being adapted when open to receive an uncured band in registry with a lower mold section and having means for closing said mold sections around a band, a detector mechanism mounted at the side of said mold sections, an arm pivotally mounted on said detector mechanism, said arm being arcuately movable angularly through a portion of the space lying immediately above the upper edge of a band whose lower edge is registered with a mold section and in close proximity past that portion of the upper edge of said band nearest said detector mechanism and switching means actuated by said detector mechanism to interrupt the power to said press upon misalignment of said band.

References Cited in the file of this patent

UNITED STATES PATENTS

| 1,568,083 | Osswald | Jan. 5, 1926 |
|---|---|---|
| 2,373,582 | Kuehl | Apr. 10, 1945 |
| 2,383,313 | Hoffman et al. | Aug. 21, 1945 |
| 2,425,438 | ONeal | Aug. 12, 1947 |
| 2,655,240 | Bohaboy et al. | Oct. 13, 1953 |
| 2,807,049 | Kimbro | Sept. 24, 1957 |
| 2,809,541 | Witt | Oct. 15, 1957 |